(12) United States Patent
Iversen et al.

(10) Patent No.: US 12,191,642 B2
(45) Date of Patent: Jan. 7, 2025

(54) CABLE JOINTS IN WET OR SEMI-WET CABLE SYSTEMS

(71) Applicant: NEXANS, Courbevoie (FR)

(72) Inventors: Oyvind Iversen, Ski (NO); Torunn Lund Clasen, Halden (NO)

(73) Assignee: NEXANS, Courbevoie (FR)

( * ) Notice: Subject to any disclaimer, the term of this patent is extended or adjusted under 35 U.S.C. 154(b) by 100 days.

(21) Appl. No.: 17/955,348

(22) Filed: Sep. 28, 2022

(65) Prior Publication Data

US 2023/0116698 A1 Apr. 13, 2023

(30) Foreign Application Priority Data

Oct. 6, 2021 (EP) ..................................... 21306410

(51) Int. Cl.
*H02G 9/02* (2006.01)
*H02G 15/08* (2006.01)

(52) U.S. Cl.
CPC ............... *H02G 15/08* (2013.01); *H02G 9/02* (2013.01)

(58) Field of Classification Search
CPC ........ H02G 15/184; H02G 1/14; H02G 15/24; Y10T 29/49195
USPC ..................................................... 174/21 JS
See application file for complete search history.

(56) References Cited

U.S. PATENT DOCUMENTS

| | | | | |
|---|---|---|---|---|
| 10,177,468 B2* | 1/2019 | Allais | ................. | H02G 15/1806 |
| 10,680,420 B2* | 6/2020 | Caimi | .................. | H02G 1/1273 |
| 10,777,988 B2* | 9/2020 | Marthinsen | .......... | H02G 15/003 |
| 2004/0097131 A1* | 5/2004 | Varreng | ............... | H01R 13/523 |
| | | | | 439/587 |
| 2009/0218135 A1* | 9/2009 | Vallauri | ............... | H02G 15/184 |
| | | | | 174/88 C |
| 2011/0017509 A1* | 1/2011 | Galletti | .................... | H01B 1/24 |
| | | | | 252/511 |
| 2012/0125655 A1* | 5/2012 | Schutt | .................... | H02G 15/18 |
| | | | | 174/145 |
| 2014/0124263 A1 | 5/2014 | Pierluigi et al. | | |
| 2018/0138686 A1* | 5/2018 | León-Guarena | ..... | H02G 3/0481 |
| 2018/0309273 A1* | 10/2018 | Caimi | .................. | H02G 1/1273 |
| 2019/0237217 A1* | 8/2019 | Shroll | ...................... | H01B 7/14 |
| 2023/0139062 A1* | 5/2023 | Mauri | .................... | H01B 7/282 |
| | | | | 174/21 R |

FOREIGN PATENT DOCUMENTS

EP 3 879 652 9/2021

OTHER PUBLICATIONS

Weerheim Ruben: "Development of dynamic power cables for commercial floating wind farms", Nov. 12, 2018.
James Young: "Innovative 72 kV Wet-Design Cables for Dynamic Deepwater Power Umbilicals", Apr. 5, 2017.
International Search Report Mar. 10, 2022.

\* cited by examiner

*Primary Examiner* — Timothy J Thompson
*Assistant Examiner* — Michael F McAllister
(74) *Attorney, Agent, or Firm* — Sofer & Haroun, LLP

(57) ABSTRACT

A dry joint for jointing a cable with a wet or semi-wet/semi-dry design to a cable with a wet, semi-wet/semi-dry or dry design and a method of manufacturing a cable dry joint are provided. A cable with a wet or semi-wet/semi-dry design having an end of cable water barrier is also provided. A dry joint water barrier suitable for rendering a joint dry is also provided, where at least one of the jointed cables is of a wet or semi-wet/semi-dry design.

3 Claims, 7 Drawing Sheets

CABLE JOINTS IN WET OR SEMI-WET CABLE SYSTEMS

RELATED APPLICATION

This application claims the benefit of priority from European Patent Application No. 21 306 410.8, filed on Oct. 6, 2021, the entirety of which is incorporated by reference.

FIELD OF THE INVENTION

The present invention relates to a method for waterproofing a joint between a wet or semi-wet power cable and a wet, semi-wet or dry power cable.

BACKGROUND

Offshore installations like offshore wind driven turbine generators supply power to a collection station, which in turn supplies power ashore. This is achieved by means of submarine power cables. These submarine power cables are connected to the offshore installation on one end, lie on the seabed and are connected to another installation on the other end. The section where the cable lies on the seabed is called the static section. Between the offshore installation and the zone where the cable lies on the seabed, the cable is raised from the seabed and enters the offshore installation. This is in part due to the potential for localised scouring to occur near the structure. The section where the cable is raised from the seabed is called the dynamic section.

The offshore wind market is considered to raise normal common operating voltage from 72.5 to 145 kV and export cables to shore may be designed for 245 kV.

Conventional cables at this voltage level use lead as a water barrier but these cables cannot be utilized in a dynamic situation, i.e. as experienced in the dynamic section, due to poor performance.

Cables with a lead water barrier, or another type of metal barrier suitable for the static section, will therefore need to be jointed to the cable designed for the dynamic sections.

A cable of a dry design is a cable with water barrier such as an extruded lead sheath or other metal barriers over insulation A cable of a semi-wet/semi-dry design, referred to as a semi-wet design, is a cable with a polymer (e.g. PE) sheath over a non-fully impervious metallic screen (e.g. metal tapes or thermoglued foils).

A cable of a wet design is a cable without any polymeric sheath over a non-fully impervious metallic screen (e.g. metal tapes) or without metallic screen.

Cables adapted for the dynamic sections will have a wet design, or alternatively a semi-wet design.

EP3381040 discloses a flexible vulcanized joint between two electric power cables and a process for producing said joint.

EP2248237 discloses a method for joining two or more cable ends using an external sleeve.

U.S. Pat. No. 5,875,547 describes a sealing method for a joint between two insulated cable conductors, by moulding a sheath made of insulation material Several solutions for jointing submarine power cables are known, but all have various disadvantages that should be overcome. One such drawback is that these joints will not be adapted for the new high voltage standards where the cable needs to be of dry type. A wet joint is (as for wet insulation system) proven for voltages up to 52 kV (potentially 72.5) but from 72.5 and especially for higher voltage level, the joint will need to be of dry design in order to prevent water ingress which may lead to an electrical bream down of the joint. If one of the cables is of static design it is often a long and expensive cable while a dynamic cables will be shorter and in the event of failure this could be replaced. A joint is potentially a weak point and if the jointing area can be designed to be dry, this will be advantageous.

OBJECTS AND SUMMARY OF THE INVENTION

The main objective of the invention is to provide a dry joint for water barrier suitable for dynamical submarine power cables.

The present invention is defined by the appended claims and in the following.

In a first aspect, the invention relates to a method of manufacturing a cable dry joint for joining a first and a second cable, wherein the first cable and the second cable are of a wet or semi-wet design, the method comprising the steps of:
a) providing the first cable;
b) providing the second cable;
c) installing an end section water barrier on an end section of the first cable, wherein the end section water barrier is longer than the longitudinal water ingress of the first cable,
installing an end section water barrier on an end section of the second cable
wherein the end section water barrier is longer than the longitudinal water ingress of the second cable, and
d) jointing said first and second cables;
e) installing a joint water barrier around the joint;
f) jointing the joint water barrier to the end section water barrier of the first cable; and
g) jointing the joint water barrier to the end section water barrier or water barrier of the second cable.

Here the person skilled in the art will understand that the end section water barrier will extend from the section to be jointed (near the end of the cable) and not necessarily the end of the cable as the cable needs to be stripped layer by layer to be jointed. Prior to the joining, at the cable end, the inner layers will extend further than the outer layer onto which the end section water barrier is installed. The end section water barrier is installed such that the end section is shielded from direct water contact and lateral water ingress. In the longitudinal direction the end section water barrier is longer than the longitudinal water ingress of the cable, such that water cannot penetrate trough the cable from a position outside the end section water barrier and into the joint.

The longitudinal water ingress is the length where water ingress results in a moisture content above the equivalent of 70% relative humidity (ISO 760). The jointing of the of the different water barrier elements are such that the jointed water barrier parts form a continuous water barrier over the cable and joint sections covered thereby.

A cable of a dry design is a cable with a water barrier, such as an extruded lead sheath, folded and welded metal strip, corrugated metal house, etc. over insulation A cable of a semi-wet/semi-dry design, referred to as a semi-wet design, is a cable with a polymer (e.g. PE) sheath over a non-fully impervious metallic screen (e.g. metal tapes or thermoglued foils).

A cable of a wet design is a cable without any polymeric sheath over a non-fully impervious metallic screen (e.g. metal tapes).

In an embodiment of the method, the jointing of the water barrier is achieved by welding or any other suitable method such as soldering. Examples of jointing methods include traditional fusion welding using a tungsten inert gas (TIG) or metal inert gas (MIG) technique, and a cold compression.

In a second aspect, the invention relates to a method of manufacturing a cable dry joint for joining a first and a second cable, wherein the first cable is of a wet or semi-wet design and the second cable is of dry design, the method comprising the steps of:
a) providing the first cable;
b) providing the second cable;
c) installing an end section water barrier on an end section of the first cable, wherein the end section water barrier is longer than the longitudinal water ingress of the first cable,
d) jointing said first and second cables;
e) installing a joint water barrier around the joint;
f) jointing the joint water barrier to the end section water barrier of the first cable; and
g) jointing the joint water barrier to the end section water barrier or water barrier of the second cable.

In a third aspect, the invention relates to a dry joint between a first and a second cable, wherein the first cable and the second cable are of a wet or semi-wet design, the dry joint comprising:
a core joint between said first and second cables;
a joint water barrier covering the core joint, and
an end section water barrier covering an end section of the first cable wherein the end section water barrier is longer than the longitudinal water ingress of the first cable,
an end section water barrier covering an end section of the second cable, wherein the end section water barrier is longer than the longitudinal water ingress of the second cable;
and;
wherein
the joint water barrier and the end section water barrier of the first cable are welded together; and
the joint water barrier and the end section water barrier or the water barrier of the second cable are welded together.

A core joint is a joint comprising an electrical core joint and insulation layer.

In a fourth aspect, the invention relates to a dry joint between a first and a second cable, wherein the first cable is of a wet or semi-wet design, and the second cable is of dry design, the dry joint comprising:
a core joint between said first and second cables;
a joint water barrier covering the core joint, and
an end section water barrier covering an end section of the first cable wherein the end section water barrier is longer than the longitudinal water ingress of the first cable,
and;
wherein
the joint water barrier and the end section water barrier of the first cable are welded together; and
the joint water barrier and the end section water barrier or the water barrier of the second cable are welded together.

In a fifth aspect, the invention relates to a cable of wet or semi-wet design, the cable comprising an end section water barrier, wherein the end section water barrier extends from an end of the cable and is longer than the longitudinal water ingress of the cable In a sixth aspect, the invention relates to a water barrier for rendering a joint dry, wherein the water barrier comprises
a joint water barrier covering a joint between a first cable of wet or semi-wet design and a second cable of wet, or semi-wet design;
an end section water barrier covering an end section of the first cable wherein the end section water barrier is longer than the longitudinal water ingress of the first cable; and
an end section water barrier covering an end section of the second cable; wherein the end section water barrier is longer than the longitudinal water ingress of the second cable.

In a seventh aspect, the invention relates to a water barrier for rendering a joint dry, wherein the water barrier comprises
a joint water barrier covering a joint between a first cable of wet or semi-wet design and a second cable of dry design;
an end section water barrier covering an end section of the first cable wherein the end section water barrier is longer than the longitudinal water ingress of the first cable.

In an embodiment of the method according to the first or second aspect, of the dry joint according to the third or fourth aspect or of the water barrier according to sixth or seventh aspect, the length of the end section water barrier on the first cable may be more than 1.1 times the longitudinal length of the water ingress. In another embodiment, the length of the end section water barrier on the first cable may be more than 1.25 times; more than 1.2 times; more than 1.5 times; more than 2 times; more than 3 times or more than 5 times the longitudinal length of the water ingress.

In a preferred embodiment of the method according to the first or second aspect, of the dry joint according to the third or fourth aspect or of the water barrier according to sixth or seventh aspect, the length of the end section water barrier on the first cable may be more than 2 times the longitudinal length of the water ingress.

In an embodiment of the method according to the first or second aspect, of the dry joint according to the third or fourth aspect or of the water barrier according to sixth or seventh aspect, the length of the end section water barrier on the first cable may be comprised between 1 and 50 times the longitudinal length of the water ingress. In another embodiment, the length of the end section water barrier on the first cable may be between 1 and 20 times, between 1 and 10 times; between 1 and 5 times; between 1 and 3 times the longitudinal length of the water ingress.

In an embodiment of the method according to the first or second aspect, of the dry joint according to the third or fourth aspect or of the water barrier according to sixth or seventh aspect, the length of the end section water barrier on the second cable may be more than 1.1 times the longitudinal length of the water ingress. In another embodiment, the length of the end section water barrier on the second cable may be more than 1.25 times; more than 1.2 times; more than 1.5 times; more than 2 times; more than 3 times or more than 5 times the longitudinal length of the water ingress.

In an embodiment of the method according to the first or second aspect, of the dry joint according to the third or fourth aspect or of the water barrier according to sixth or seventh aspect, the length of the end section water barrier on the second cable may be comprised between 1 and 50 times the longitudinal length of the water ingress. In another embodiment, the length of the end section water barrier on the second cable may be between 1 and 20 times, between 1 and 10 times; between 1 and 5 times; between 1 and 3 times the longitudinal length of the water ingress.

In an embodiment of the cable according to the fifth aspect, the length of the end section water barrier on the cable may be more than 1.1 times the longitudinal length of the water ingress. In an embodiment of the cable according to the third aspect, the length of the end section water barrier on the cable may be more than 1.25 times; more than 1.2 times; more than 1.5 times; more than 2 times; more than 3 times or more than 5 times the longitudinal length of the water ingress.

In a preferred embodiment of the cable according to the fifth aspect, the length of the end section water barrier on the cable may be more than 2 times the longitudinal length of the water ingress.

In an embodiment of the cable according to the fifth aspect, the length of the end section water barrier on the cable may be comprised between 1 and 50 times the longitudinal length of the water ingress. In another embodiment, the length of the end section water barrier may be between 1 and 20 times, between 1 and 10 times; between 1 and 5 times; between 1 and 3 times the longitudinal length of the water ingress.

In an embodiment of the method according to the first or second aspect, of the dry joint according to the third or fourth aspect or of the water barrier according to sixth or seventh aspect, the first cable may be of wet design.

In an embodiment of the method according to the first or second aspect, of the dry joint according to the third or fourth aspect or of the water barrier according to sixth or seventh aspect, the first cable may be of semi-wet design.

In an embodiment of the method according to the first aspect, of the dry joint according to the third aspect or of the water barrier according to sixth aspect, the second cable may be of wet design.

In an embodiment of the method according to the first aspect, of the dry joint according to the third aspect or of the water barrier according to sixth aspect, the second cable may be of semi-wet design.

In an embodiment of the cable according to the fifth aspect, the cable may be of wet design.

In an embodiment of the cable according to the fifth aspect, the cable may be of semi-wet design.

In an embodiment of the method according to the first or second aspect, of the dry joint according to the third or fourth aspect, or of the water barrier according to sixth or seventh aspect, wherein the water barrier may be made of lead.

In an embodiment of the method according to the first or second aspect, of the dry joint according to the third or fourth aspect, or of the water barrier according to sixth or seventh aspect, wherein the water barrier may be made of a lead-free material.

In an embodiment of the method according to the first or second aspect, of the dry joint according to the third or fourth aspect, of the cable according to the fifth aspect, or of the water barrier according to sixth or seventh aspect, the end section water barrier may be made of lead.

In an embodiment of the method according to the first or second aspect, of the dry joint according to the third or fourth aspect, of the cable according to the fifth aspect, or of the water barrier according to sixth or seventh aspect, the end section water barrier may be made of lead-free material.

BRIEF DESCRIPTION OF THE DRAWINGS

The present invention is described in detail by reference to the following drawings.

DETAILED DESCRIPTION OF THE INVENTION

Figure 1A:
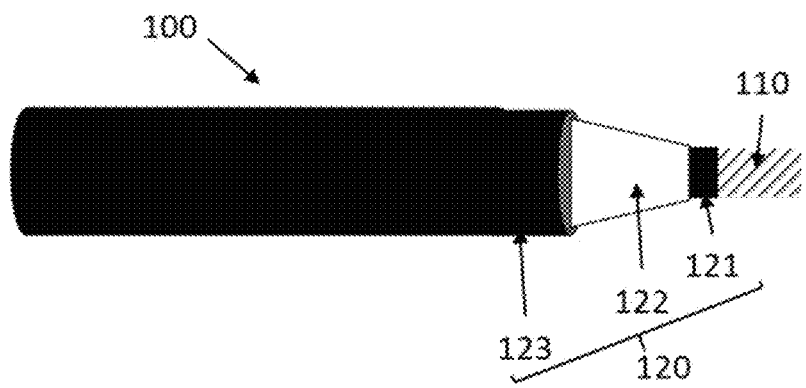
FIG. 1a-1g is a cross-sectional view of the assembly of a core joint 300 and of the dry joint water barrier 400 between a first cable 100 of wet or semi wet design and a second cable 200 of dry design.
Figure 1B:
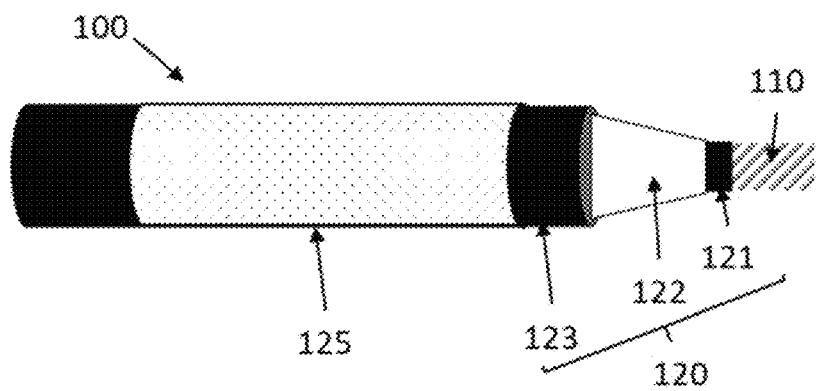

Offshore installations like offshore wind driven turbine generators supply power to a collection station, which in turn supplies power ashore. This is achieved by means of submarine power cables. These submarine power cables are connected to the offshore installation on one end, lie on the seabed and are connected to another installation on the other end. The section where the cable lies on the seabed is called the static section. Between the offshore installation and the zone where the cable lies on the seabed, the cable comes from up the seabed and enters the offshore installation. This is in part due to the potential for localised scouring to occur near the structure. This section is called the dynamic section.

High-voltage subsea power cables operating with highest continuous voltage (Um) over 72.5 kV are required to be dry, and they are usually sheathed with a lead water-barrier at Um>36 kV as recommended by IEC 60840.

Cable from the static section need to be jointed with a cable designed for the dynamic section of the similar or slightly different design. It may have different cross section of the conductors or have different insulation thickness. A dry type cable may need to be jointed with a wet or semi-wet cable.

The solution is based on using the cable itself as a radial water barrier such that it will be dry at the point of the joint. By doing such the cable will be dry at the point of joint area and an already qualified joint can be used.

FIG. 1 illustrate the method of manufacturing a cable dry joint for joining a first and a second cable 100, 200.

In this first example the first cable 100 is of a wet or semi-wet design and the second cable 200 is of a dry design. Each cable comprising an electric conductor 110; 210 and an insulation system 120; 220, surrounding the electric conductor 110; 210, the insulation system 120; 220 comprising an inner semiconducting layer 121; 221, an insulating layer 122; 222 and an outer semiconducting layer 123; 223. In addition, the second cable 200 of dry design comprises a water barrier 224.

Figure 1C:
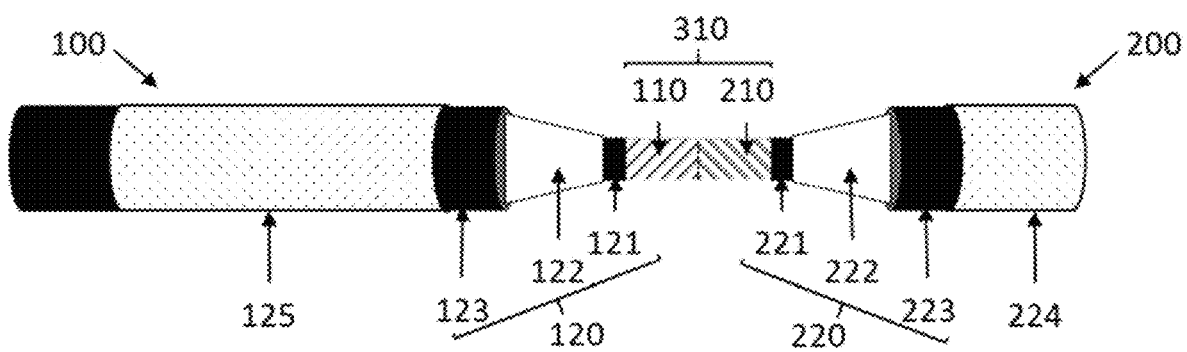
Figure 1D:
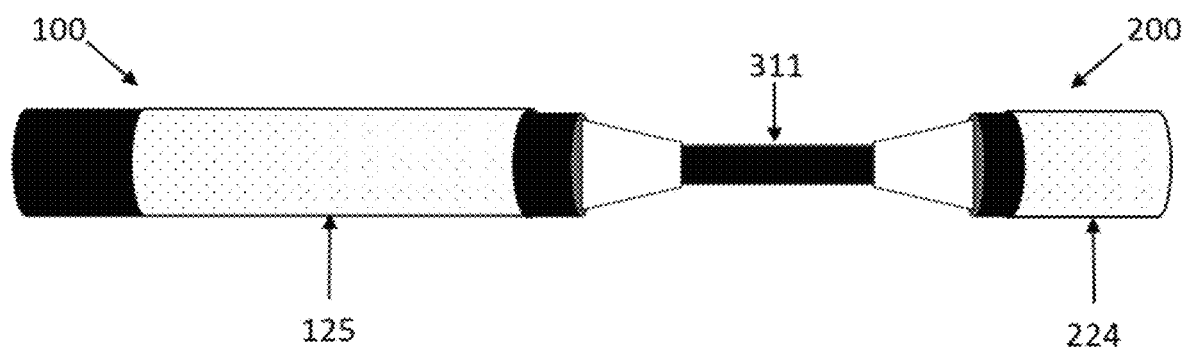
Figure 1E:
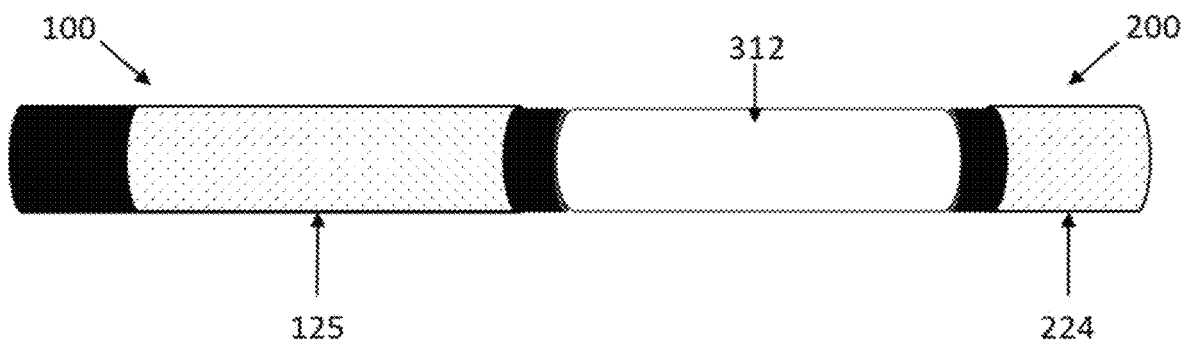
Figure 1F:
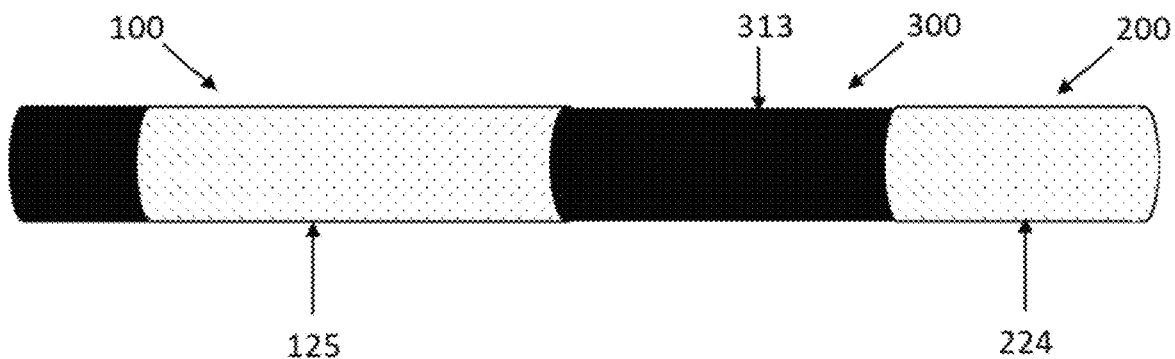
Figure 1G:
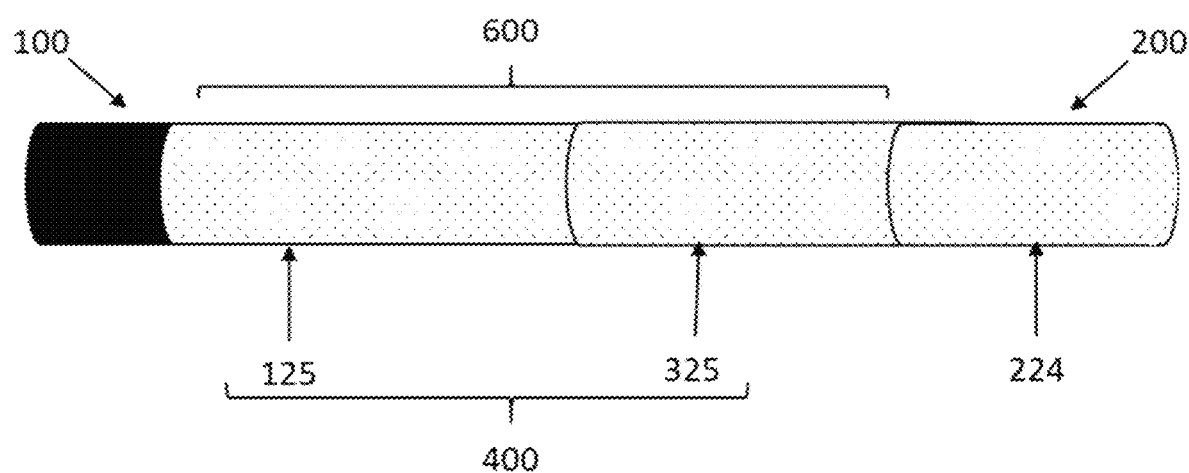

The method comprises the steps of
providing the first cable 100 of a wet or semi-wet design (FIG. 1a)
installing an end section water barrier 125 on an end section of the first cable 100,
wherein the length of the end section water barrier is 150% the length of the longitudinal water ingress of the first cable 100, (FIG. 1b)
providing the second cable 200 of dry design
joining the respective terminal portions of the electric conductors 110; 210 of the first electric cable 100 and of a second electric cable 200 placed axially adjacent to the first electric cable 100, to form an electric conductor joint 310; (FIG. 1c)

surrounding the electric conductor joint 310 with a joint inner layer 311 of a first semiconducting material; (FIG. 1d)

surrounding the joint inner layer 311 of a first semiconducting material with a joint insulating layer 312 of a insulating material (FIG. 1e); and surrounding the joint insulating layer 312 of insulating material with a joint outer layer 313 of a second semiconducting material (FIG. 1f) forming the core joint 300;

installing a joint water barrier 325 around the core joint 300;

jointing the joint water barrier 325 to the end section water barrier of the first cable 125;

the jointed joint water barrier 325 and end section water barrier of the first cable 125 form the dry joint water barrier 400; and jointing the dry joint water barrier 400 to the water barrier 224 of the second cable 200 (FIG. 1g).

In this second example the first cable 100 is of a wet or semi-wet design and the second cable 200 is of a wet or semi-wet design. Each cable comprises an electric conductor 110; 210 and an insulation system 120; 220, surrounding the electric conductor 110; 210, the insulation system 120; 220 comprising an inner semiconducting layer 121; 221, an insulating layer 122; 222 and an outer semiconducting layer 123; 223.

Figure 2A:
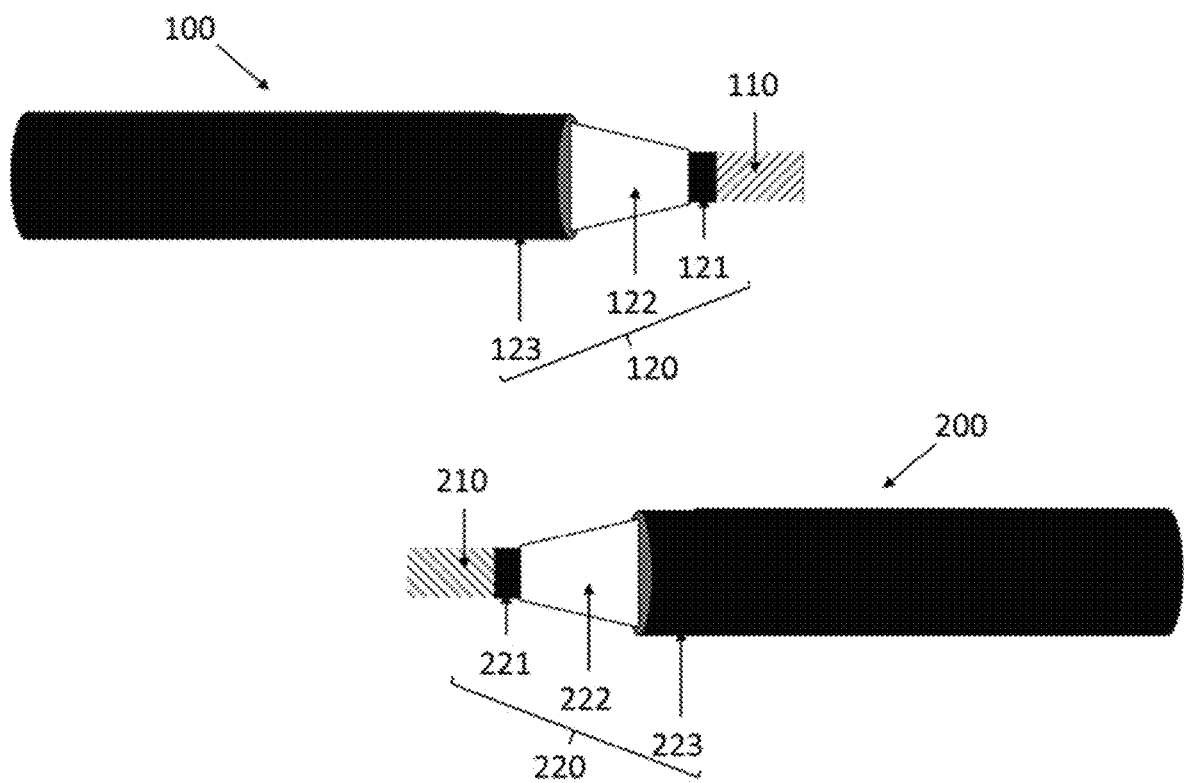
FIG. 2a-2g is a cross-sectional view of the assembly of a core joint 300 and of the dry joint water barrier 400 between a first and a second cables 100; 200 of wet or semi wet design.
Figure 2B:
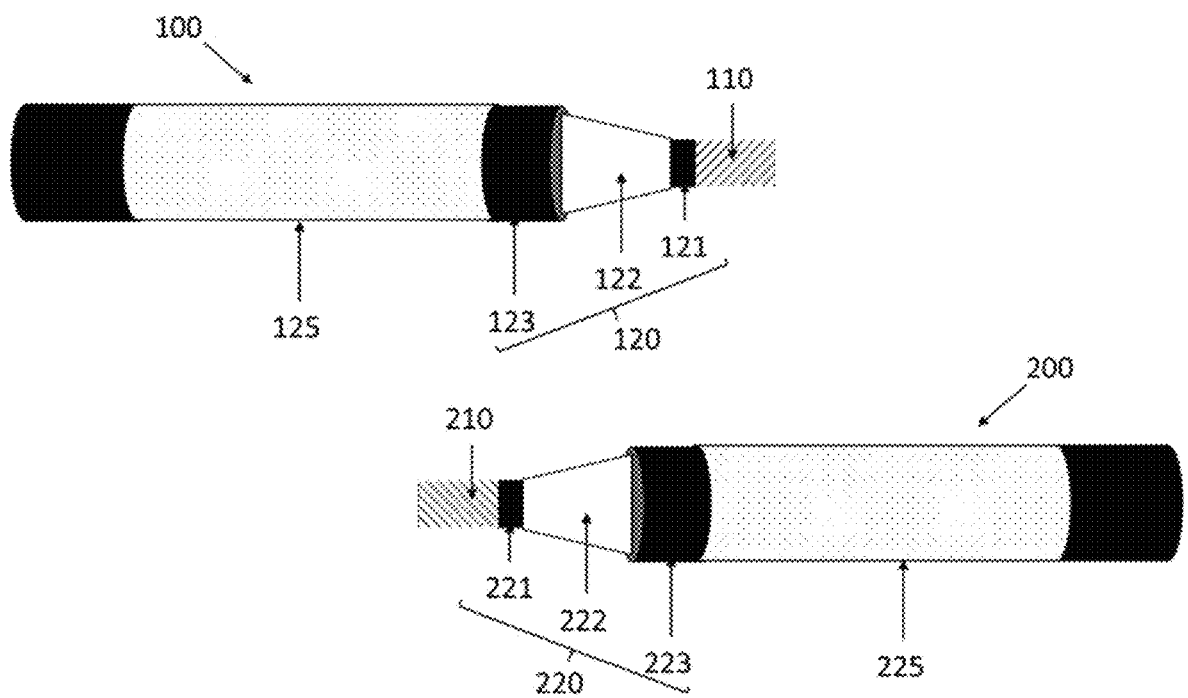
Figure 2C:
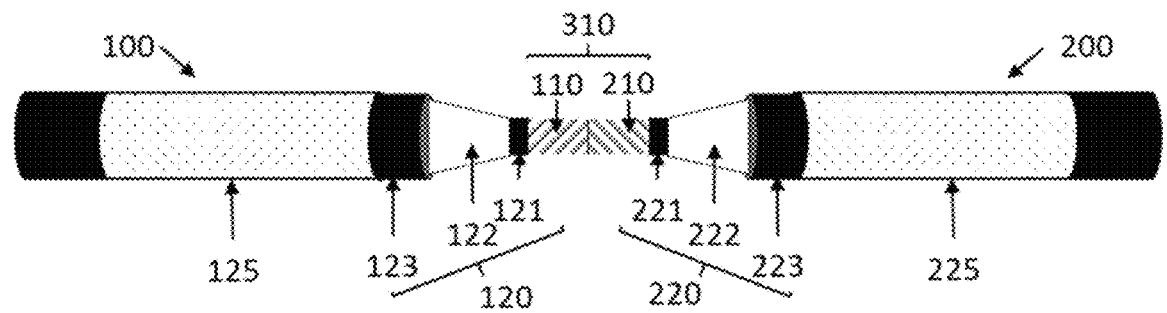
Figure 2D:
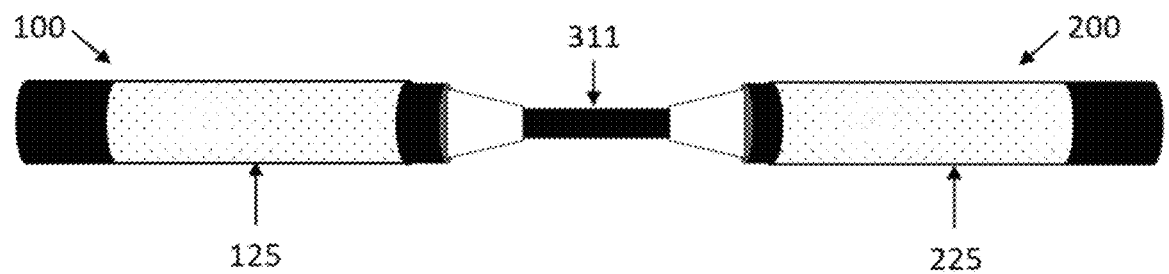
Figure 2E:
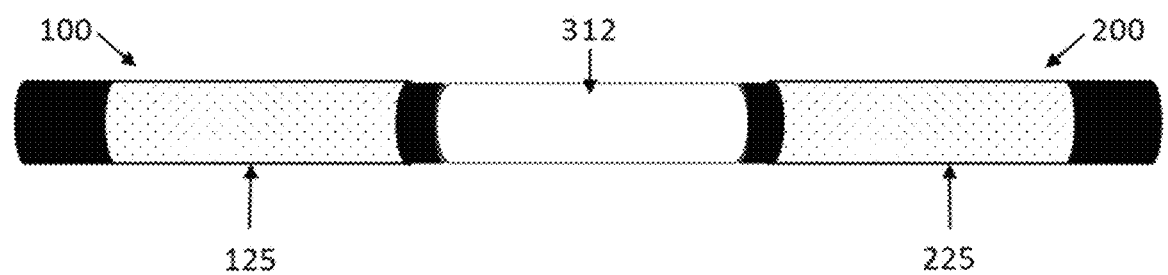
Figure 2F:
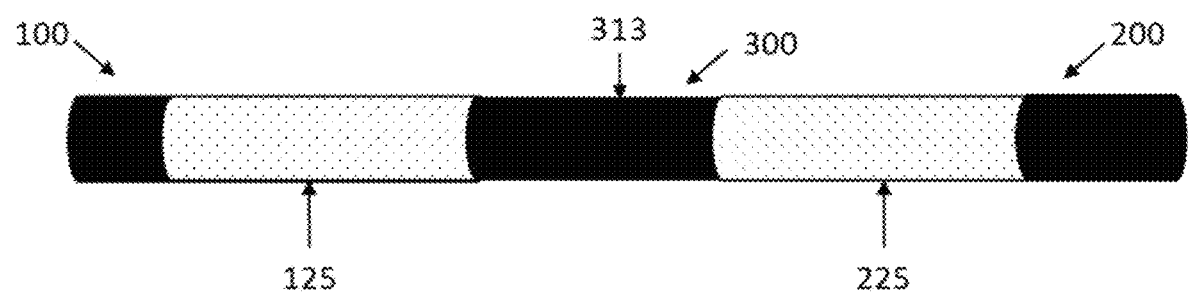
Figure 2G:
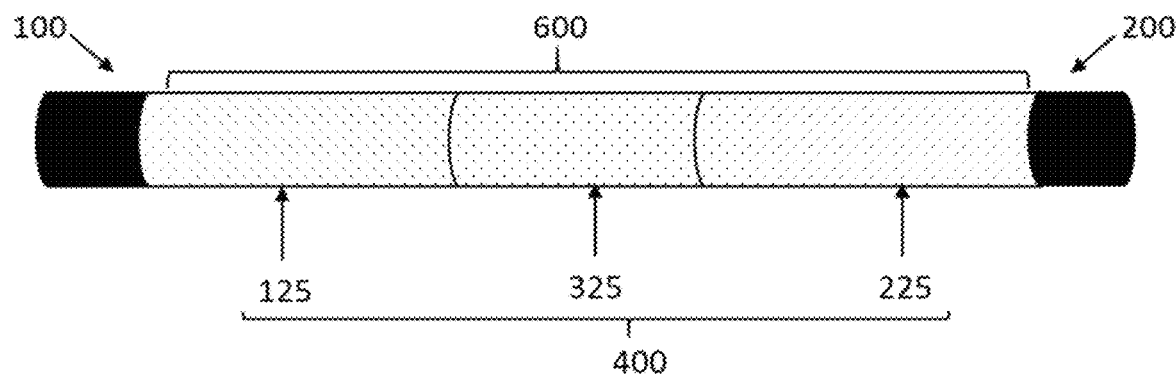

The method comprises the steps of
providing the first and second cable 100; 200 of a wet or semi-wet design (FIG. 2a)

installing an end section water barrier 125; 225 on an end section of the first and second cable 100; 200, wherein the length of each end section water barrier is 150% the length of the longitudinal water ingress of the first and cable 100; 200 respectively, (FIG. 2b)

joining the respective terminal portions of the electric conductors 110; 210 of the first electric cable 100 and of a second electric cable 200 placed axially adjacent to the first electric cable 100, to form an electric conductor joint 310; (FIG. 2c)

surrounding the electric conductor joint 310 with a joint inner layer 311 of a first semiconducting material; (FIG. 2d)

surrounding the joint inner layer 311 of a first semiconducting material with a joint insulating layer 312 of a insulating material (FIG. 2e); and surrounding the joint insulating layer 312 of insulating material with a joint outer layer 313 of a second semiconducting material (FIG. 2f) forming the core joint 300;

installing a joint water barrier 325 around the core joint 300;

jointing the joint water barrier 325 to the end section water barrier of the first and second cable 125; 225;

the jointed joint water barrier 325 and end section water barrier of the first and second cable 125; 225 form the dry joint water barrier 400 (FIG. 2g).

Figure 3:
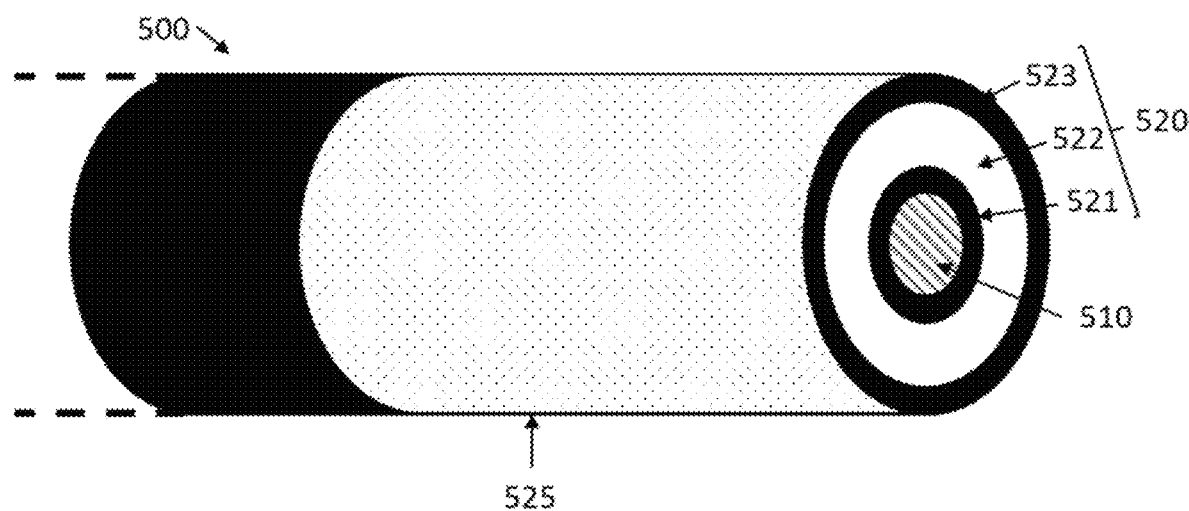
FIG. 3 is a side view of an embodiment of the cable of wet or semi-wet design 500, with an end section water barrier 525.

FIG. 3 illustrate a cable of wet or semi-wet design 500, the cable comprising an end section water barrier 525, wherein the end section water barrier extends from an end of the cable and is longer than the longitudinal water ingress of the cable. The cable 500 comprises an electric conductor 510 and an insulation system 520, surrounding the electric conductor 510, the insulation system 520 comprising an inner semiconducting layer 521, an insulating layer 522 and an outer semiconducting layer 523.

The longitudinal water ingress can be determined by the following method.

For any given cable of wet or semi wet design on which an end section water barrier according to the invention is to be installed, the moisture ingress is measured at the factory or laboratory.

100 m of the cable of wet or semi wet design is given a dry design using an end section water barrier according to the invention. The cable is then set up in a loop with a current generator.

The current generator is used to heat the conductor and the magnitude of the current reflects the size of the conductor such that the desired conductor temperature of 40° C., is reached.

Isolation material, for example glass wool or spray foam, is added around the cable, in order to control the temperature conditions during the experiment.

In the middle of the loop the water barrier is removed over a length of 1 m revealing a naked insulation segment. A portion of the cable comprising the naked insulation segment is fully immersed in a water bath containing sea water. The water bath is supplied with sea water as often as needed so that the portion of the cable comprising the naked insulation segment is fully immersed, which ensures that the water may diffuse into the insulation system.

After 12 months, the moisture level is measured by Karl Fisher analysis (ref ISO 760) in the insulation layer every 5 m on a half of the loop starting from an end of the naked insulation segment.

The water ingress is then evaluated to be the length between the end of the naked insulation segment and the first measurement point that presents a moisture level under the equivalent of 70% relative humidity (ISO 760). Here the skilled person will understand that the moisture level and the water content of a sample are equivalent.

Alternative methods to determine moisture ingress in a cable, could include incorporating a number of moisture sensors under the water barrier at regular intervals. In an alternative embodiment of the invention, moisture sensors may be incorporated under the water barrier every meter for the first 10 meters from the end of the cable/water barrier.

The person skilled in the art may adapt the interval between and the number of moisture sensors depending on the dimension of the cable.

The cable is thereafter submerged in sea water.

The moisture level is monitored over time via each moisture sensor.

When the moisture level for each moisture sensor has stopped evolving for a week, the water ingress is considered stabilized or controlled.

The water ingress is then evaluated to be the length between the end of the cable/water barrier to the first moisture sensor that measure a moisture level equivalent to under 70% relative humidity.

If the last moisture sensor measures a moisture level over 70%, the experiment is repeated by increasing the interval between and/or the number of moisture sensors.

The invention claimed is:
1. A dry joint between a first and a second cable, wherein the first cable is of a wet or semi-wet design, and the second cable is of dry design, the dry joint comprising:
a core joint between said first and second cables;
a joint water barrier surrounding the core joint, and an end section water barrier covering an end section of the first cable, wherein the end section water barrier is longer than the longitudinal water ingress of the first cable, and;

wherein the joint water barrier and the end section water barrier of the first cable are jointed together; and the joint water barrier and the end section water barrier or the water barrier of the second cable are jointed together.

2. A water barrier for rendering a joint dry, wherein the water barrier comprises a joint water barrier covering a core joint between a first cable of wet or semi-wet design and a second cable of dry design;

an end section water barrier covering an end section of the first cable, wherein the end section water barrier is longer than the longitudinal water ingress of the first cable.

3. A method of manufacturing a cable dry joint for joining a first and a second cable, wherein the first cable is of a wet or semi-wet design and the second cable is of dry design, the method comprising the steps of:

a) providing the first cable;

b) providing the second cable;

c) installing an end section water barrier on an end section of the first cable, wherein the end section water barrier is longer than the longitudinal water ingress of the first cable, d) jointing said first and second cables;

e) installing a joint water barrier around the core joint;

f) jointing the joint water barrier to the end section water barrier of the first cable; and g) jointing the joint water barrier to the end section water barrier or water barrier of the second cable.

\* \* \* \* \*